United States Patent [19]
Akasu

[11] Patent Number: 5,552,893
[45] Date of Patent: Sep. 3, 1996

[54] DISTANCE MEASURING APPARATUS

[75] Inventor: Masahira Akasu, Hyogo, Japan

[73] Assignee: Mitsubishi Denki Kabushiki Kaisha, Tokyo, Japan

[21] Appl. No.: 306,327

[22] Filed: Sep. 15, 1994

[30]    Foreign Application Priority Data

Sep. 17, 1993  [JP]  Japan .................................. 5-231704

[51] Int. Cl.$^6$ ........................................................ G01C 3/08
[52] U.S. Cl. ......................................... 356/5.01; 356/4.01
[58] Field of Search ................................. 356/5.01, 5.03, 356/4.01

[56]              References Cited

U.S. PATENT DOCUMENTS 5,210,586  5/1993  Grage et al. ................................. 356/5
5,278,423  1/1994  Wangler et al. ............................. 356/4
5,998,130  3/1995  Redman ...................................... 359/155

*Primary Examiner*—Mark Hellner
*Attorney, Agent, or Firm*—Sughrue, Mion, Zinn, Macpeak & Seas; Richard C. Turner

[57]             ABSTRACT

A distance measuring apparatus comprises projection means, light receiving means, computation means and scanning means. The projection means projects plural laser beams in different directions. The light receiving means receives the light reflected from each of objects in respective beam directions. The computation means computes the distances to the objects on the basis of the reflected light. And the scanning means sequentially changes the projecting directions of said plural laser beams.

6 Claims, 3 Drawing Sheets

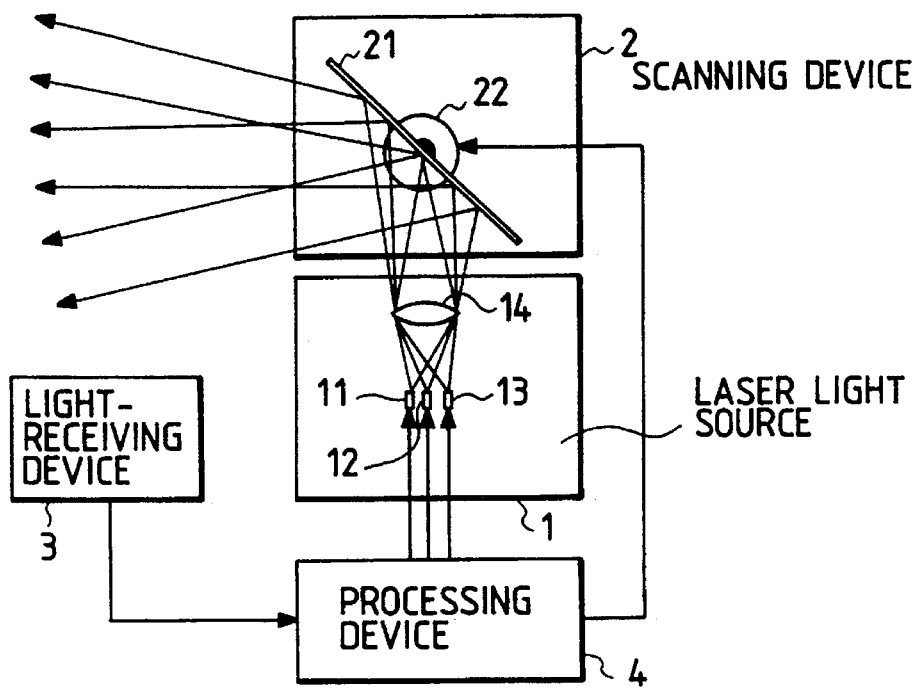
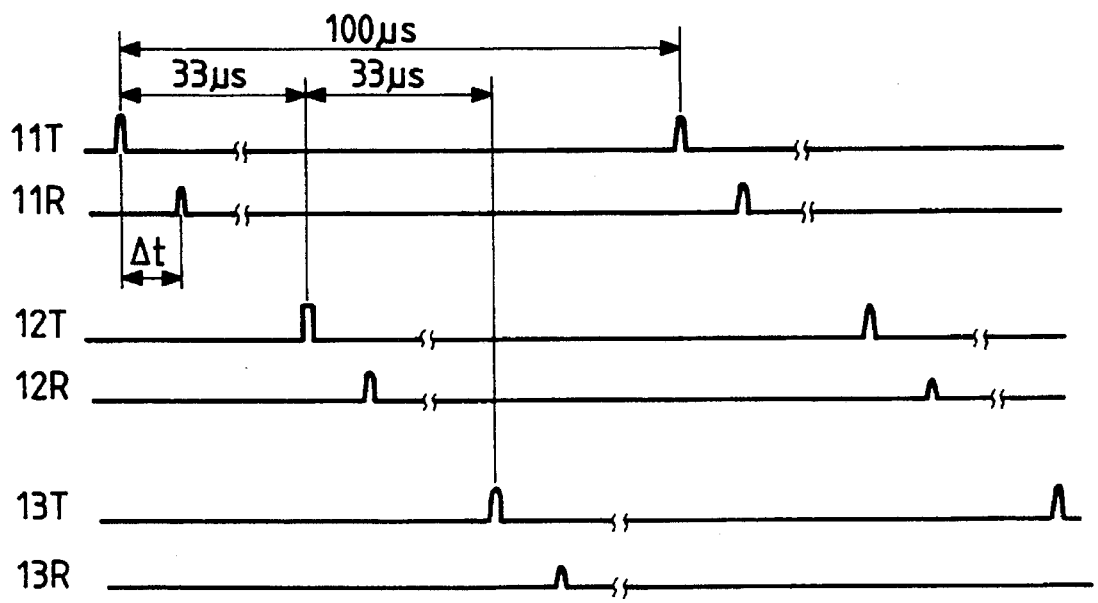

FIRST STEP → SECOND STEP → THIRD STEP →

FIRST STEP → SECOND STEP → THIRD STEP →

FIRST STEP → SECOND STEP → THIRD STEP → FOURTH STEP

FIRST STEP → SECOND STEP → THIRD STEP → FOURTH STEP → FIFTH STEP → SIXTH STEP →

DISTANCE MEASURING APPARATUS

BACKGROUND OF THE INVENTION

The present invention relates to a distance measuring apparatus which scans a laser beam in one direction and receives the light beam reflected from an object in the direction to calculate the distance to the object on the basis of the received light signal.

As one example of such kinds of distance measuring apparatus Examined Japanese Patent Publication No. Sho. 55- 1555 proposes an apparatus which confines laser light emitted from one light source in a horizontal direction by an optical system to make an elliptical or rectangular laser beam enlarged in a vertical direction and scans the resultant laser beam in the horizontal direction at a fixed period to measure the distance to an object in the beam direction for each scanning angle.

Examined Japanese Patent Publication No. Sho. 61- 54187 proposes an apparatus which raster-scans a field of view with a laser beam by an X - Y scanner to measure a distance two-dimensionally.

Where distance measuring is to be performed in plural directions by scanning in such a distance measuring device, in order to complete the distance measuring in all desired directions, it is necessary to perform the one-direction distance measuring by the number of times corresponding to the number of divisions. Generally, the projection of a laser beam by one light source requires a relatively long period because of several electrical limitations. It takes time to perform the projection a large number of times, i.e. distance measuring. Actually, the scanning mechanism for directing the beam to a predetermined direction must be driven by the number of times corresponding to the above number of divisions. Thus, it takes a considerably long time to complete the distance measurement in all directions.

Such a kind of distance measuring apparatus is mounted in a vehicle e.g. toward its running direction to detect simultaneously plural preceding vehicles and/or obstacles on a road thereby recognizing these preceding vehicles or generating a warning of the obstacles. In this case, since the vehicle at issue and preceding vehicles are always running, if it takes a long time for distance measurement, the objects (precedent vehicles, obstacles, etc.) in the field of view ahead of the vehicle at issue will shift greatly during the distance measurement. As a result, detection of the distances to the objects and time-change in scanning directions will be delayed. This leads to a recognition delay for the vehicles and obstacles or false recognition producing a false warning. Accordingly, there is a possibility that the above apparatus cannot be actually used.

SUMMARY OF THE INVENTION

The present invention has solved such a problem, and intends to provide a scanning type distance measuring apparatus which can perform distance measurement at a high speed in plural directions.

A distance measuring apparatus according to the present invention, in the distance measuring apparatus which projects plural laser beams in different directions and receives the light reflected from each of objects in respective beam directions to compute the respective distances, simultaneously scans the plural laser beams to measure the distances to the objects in the respective beam directions.

Furthermore, in the distance measuring apparatus which projects plural laser beams in different directions and receives the light reflected from each of the objects in the respective beam directions to compute the respective distances, the distance measuring apparatus scans the plural laser beams in the same direction as their alignment directions to measure the distance in each beam direction.

Still further, in the distance measuring apparatus which projects plural laser beams in different directions and receives the light reflected from each of the objects in the respective beam directions to compute the respective distances, the distance measuring apparatus scans the plural laser beams in the directions orthogonal to their alignment directions to measure the distance in each beam direction.

Still further, the distance measuring apparatus of the invention projects the plural laser beams in different separated directions so that they do not overlap each other and the scanning of the respective laser beams is performed in such a manner that the intervals between them are interpolated.

Still further, the distance measuring apparatus of the invention projects the plural laser beams in different separated directions so that they do not overlap each other and scans the respective laser beams in such a manner that the intervals between them are interpolated and thereafter shifts the scanning to the outermost adjacent position of the next scanning state.

Still further, the distance measuring apparatus of the invention divides every interval between two adjacent laser beams of N laser beams into the intervals integer-times less than the square of N and prime number of N and other than 1, and performs the scanning in such a manner that the shift of said divided N intervals is made as one scanning.

In accordance with the distance measuring apparatus of the present invention, the period of one scanning can be reduced to a fraction of the number of plural beams.

Furthermore, in accordance with the distance measuring apparatus of the invention, one-dimensional distance measurement in a scanning direction can be performed at a high speed.

Still further, in accordance with the distance measuring apparatus of the invention, two-dimensional distance measurement can be performed at a high speed.

Still further, according to the distance measuring apparatus of the invention, an optical system for making plural laser beams can be miniaturized.

Still further, according to the distance measuring apparatus of the invention, an optical system for making plural laser beams can be miniaturized and the freedom in designing the optical system can be increased.

Still further, in accordance with the distance measuring apparatus of the invention, the intervals between plural laser beams can be efficiently filled.

BRIEF DESCRIPTION OF THE DRAWINGS

FIG. 1 is a view showing the configuration of the first embodiment of the present invention;

FIG. 2 is a view showing the operation of the first embodiment of the present invention;

DETAILED DESCRIPTION OF THE PREFERRED EMBODIMENTS

Figure 3:
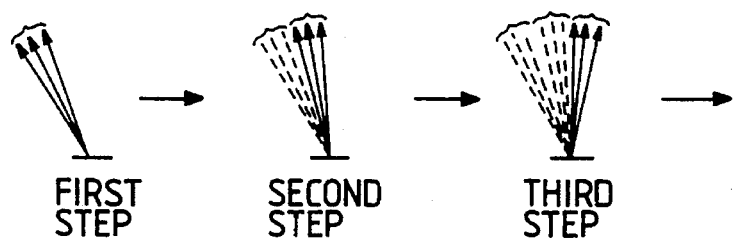
FIG. 3 is a view showing the operation of the first embodiment of the present invention.

One embodiment of the present invention will be explained in connection with drawings. In FIG. 1, reference numeral 1 denotes a laser light source for emitting laser beams in three directions. The light source 1 comprises laser diodes 11, 12 and 13 which are arranged at intervals of 1 mm and emit pulse laser light, and a converging lens 14 which has a focal distance of 115 mm and converges the pulse light emitted from the laser diodes 11, 12 and 13. Reference numeral 2 denotes a scanning device having a mirror 21 for reflecting laser beams emitted from the laser light source 1 and a stepping motor 22 for swinging/driving the mirror 21 to scan the laser beams. Reference numeral 3 denotes a light-receiving device for receiving the pulse light reflected and returned from objects when the laser beams pulse-emitted from the laser diodes 11, 12 and 13 are scanned and hit on the objects, and converting it into an electric signal. Reference numeral 4 denotes a processing device for computing the distance in each of directions by measuring the going and returning time of the reflected pulse light received by the light receiving device 3 on the basis of the driving of the laser diodes 11, 12 and 13 of the laser light source 1, the driving of the stepping motor 22 of the scanning device 2 and pulse light emission timings of the laser diodes 11, 12 and 13.

An explanation will be given of the operation of the first embodiment thus designed. As indicated by 11T, 12T and 13T in FIG. 2, the processing device 4 sequentially pulse-drives the laser diodes 11, 12 and 13 of the laser light source 1 in a period of 100 μs at time intervals of 33 μs from one another, respectively to emit the pulses each having a very short time-width of about 300 ns. The laser pulse light sequentially emitted from the laser diodes 11, 12 and 13 is generally composed of beams having weak directivity. But these beams are converged by the converging lens 14 into three substantially parallel beams the directions of which have an angle difference of $\tan^{-1}(1/115)=0.5°$ from one another. In the scanning device 2, the mirror 21 is arranged so that the converged three laser beams are incident at approximately 45°. The shaft of the mirror 21 which is orthogonal to the alignment direction of the three laser beams is driven by the stepping motor 22. One step angle of the stepping motor 22 is 0.75° so that the mirror 21 rotates 0.75° for each one step. Thus the laser beams of the pulse light reflected from the mirror 21 deflect in their beam directions by about 1.5° which is twice as large as the rotating angle of the mirror 21. The laser beams reflected from the mirror 21 are reflected from objects (not shown) and incident on the light receiving device 3 as reflected pulse light. The waveforms of the reflected pulse light corresponding to the three laser beams are shown by 11R, 12R and 13R in FIG. 2. The light receiving device 3 converts the reflected pulse light in an electric signal which is supplied to the processing device 4. The processing device 4 determines the time Δt from when the pulse light is emitted from e.g. the laser diode 11 to when the reflected pulse light is received by the light receiving device 3. The processing device 4 multiplies ½ of the time Δt by the speed of light ($3\times10^8$ m/s) to calculate the distance to an object. Likewise, the reflected pulse light corresponding to the pulse light emitted from the laser diodes 12 and 13 is received by the light receiving device 3. The distances in the respective directions are calculated by the processing device 4. As described above, the laser diodes 11, 12 and 13 emit light at intervals of 100 μs so that the reflected light for each of the respective beams can be easily distinguished from each other in time. In short, the distance in each beam direction is measured at intervals of 100 μs. This measurement is repeated ten times for each beam for one step of scanning in the scanning device 2. The average value of the distances measured ten times is adopted as the measured distance in one direction to enhance the reliability of the distance data. Thus, the measurement time for one step of scanning is about 1 ms. If the scanning is carried out from left to right as shown in a FIG. 3 in total of ten steps, since three directions are provided for each step, the distance measurement in total of 30 directions can be performed for 10 ms. The field of view obtained at this time is 1.5°×10 (step)=15°

Since the distance measurement in three directions is carried out almost simultaneously (at slight time intervals of 33 μm) using the laser light source 1 including laser diodes 11, 12 and 13, if the scanning device 2 performs the beam scanning by ten steps, the processing device 4 can make the distance measurement in total of 30 directions. Thus, a high speed scanning-type distance measuring apparatus can be constructed as compared with the distance measuring apparatus which scans a single beam in 30 (thirty) directions. In this embodiment, although the scanning was performed in the same direction as the alignment direction of three laser diodes 11, 12 and 13, this is not necessarily required. The laser diodes 11, 12 and 13 are not required to be aligned in a line. The scanning may be performed in any optional direction in accordance with use.

Figure 4:
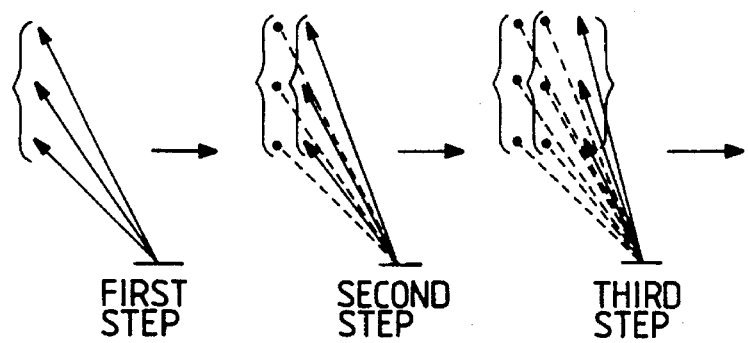
FIG. 4 is a view showing the operation of the second embodiment of the present invention.

In a second embodiment, the laser diodes 11, 12 and 13 are aligned in a direction orthogonal to their scanning direction so that two-dimensional distance measurement can be carried out as shown in FIG. 4. Since the scanning device having the mirror 21 and stepping motor 22 for scanning used in the first embodiment can be used as it is, a high-speed two-dimensional distance measuring apparatus can be realized in simple structure and at low cost without using a complicate complicated mechanism such as an X - Y scanner for raster scan. The distance measurement area is a square resulting from (number of laser diodes: 3)×(number of scanning points), but if the number of laser diodes in the laser light source 1 and that of the scanning points of the scanning device 2 are optionally selected, any area of the two-dimensional distance measurement can be configured.

Figure 5:
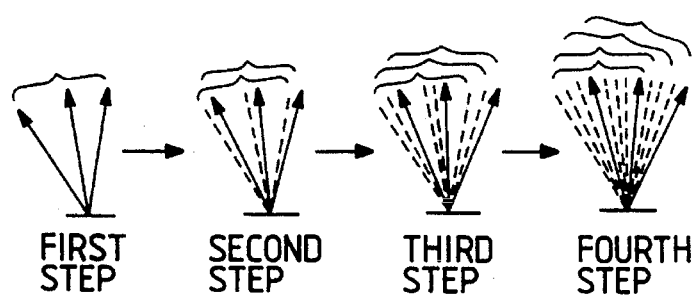
FIG. 5 is a view showing the operation of the third embodiment of the present invention.

In the first embodiment, the laser beams projected from the three laser diodes 11, 12 and 13 in the laser light source 1 are converged by the convex lens having a focal distance of 115 mm and the scanning device 2 simultaneously scans by for every 1.5° each of these beams the directions of which have an angle difference of 0.5° from each other. But, as shown in FIG. 5, in a third embodiment, the interval between the respective beams may be set for a larger value so that the open areas between the beams are filled by scanning. For example, using the convex lens having a focal distance of 28.5 mm, with the interval of 2° between the laser beams, the three beams are scanned for each step of 0.5°. Then, the intervals between the laser beams can be uniformly filled by four-times scanning to provide a total field of view of 6°. In this embodiment, the beam interval was set for 2° which is four-times as large as the resolution of the resultant field of view. But if it is set for not four-times but integer-times, the intervals can be filled by the scanning for each resolution of field of view (0.5° in this embodiment). Thus, a wider field of view can be obtained. The lens for converging laser beams having a shorter focal distance can be adopted so that the shape of the optical system can be made compact.

Figure 6:
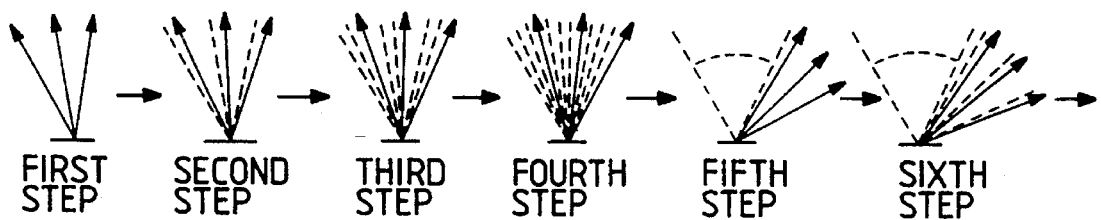
FIG. 6 is a view showing the operation of the fourth embodiment of the present invention.

In the third embodiment, the intervals between the three beams can be uniformly filled by performing the scanning in such a manner that they are uniformly filled. But, in a fourth embodiment, the field of view is limited by the optical system which enlarges the intervals between the three beams. Specifically, the resultant field of view will be (angle between the beams)×(number of beams). In order to obviate such an inconvenience, the laser beams are scanned by the scanning device 2 so as to repeat the scanning of 0.5° four times and 4.5° once as shown in FIG. 6, namely so as to move the beams to subsequent areas after filling the intervals between the beams by scanning. Thus, the intervals between the beams can be entirely filled by each step of 0.5° and also the field of view is not limited by the optical system, thereby realizing an increase of design freedom and miniaturization in the optical system.

Figures 7, 8:
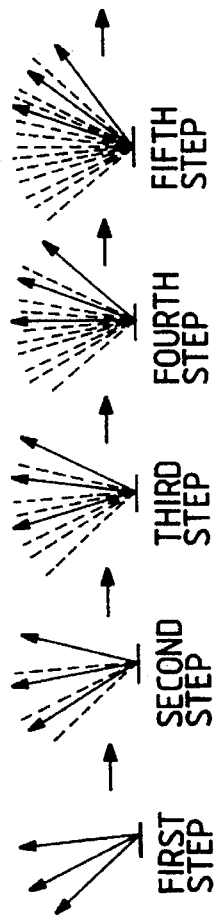
FIG. 7 is a view showing the operation of the fifth embodiment of the present invention.
FIG. 8 is a view showing the operation of the fifth embodiment of the present invention.

In a fifth embodiment, a convex lens having a focal distance of 28.5 mm is used, and the intervals between the resultant three beams having an interval of 2° are filled by scanning for every 0.5° which is a resolution of the field of view. In this case, as shown in FIG. 7, the scanning of the laser beams by the scanning device 2 is performed in ten steps each having 1.5° which is obtained by multiplying the number of the laser beams by the resolution of the field of view of 0.5°. Thus, the intervals between central 24 points are entirely filled with the beams for every 0.5° whereas the beams can be coarsely distributed between the points in the periphery. The manner in a measurement direction for the above scanning steps is shown in FIG. 8. As seen from FIG. 8, in the periphery, distance measurement is carried out for each coarse step over a wide field of view, whereas in the neighborhood of center, the distance measurement is carried out for each dense step. When the apparatus according to this embodiment mounted in a vehicle is used to detect obstacles or vehicles ahead of the vehicle at issue, it is possible to measure the distance to the obstacles or vehicles in a running lane at issue within a central area filled densely with beams and detect an interrupting vehicle from an adjacent running lane in the periphery where the intervals between the beams are coarse. This embodiment, in which the step of scanning may be always a fixed step of 1.5°, can provide a distance measuring apparatus which is simple in scanning and does not perform useless distance measurement with no overlap of the beams. The number of beams, intervals and scanning steps which can realize such an advantage are not limited to their combination in this embodiment. They can be realized in such a manner that every interval between two adjacent laser beams of N laser beams are divided into a number of the intervals less than square of N, other than integer-times of any prime numbers less than N and other than 1, and the scanning is performed in such a manner that the shift of said divided N intervals is made as one scanning.

As described above, a distance measuring apparatus of the first embodiment of the present invention projects plural laser beams in different directions and receives the light reflected from each of the objects in the respective beam directions to compute the respective distances, and simultaneously scans the plural laser beams to measure the distances to the objects in the respective beam directions. Therefore, in accordance with the distance measuring apparatus of first embodiment, the distance measurement time required to perform scanning once can be reduced to a fraction of the number of plural beams as compared with the case where the distances in plural directions are measured by the scanning using one beam. This permits the apparatus to be applied to the use of vehicles requiring high speed computation and provides remarkable practical effects.

Furthermore, a distance measuring apparatus of the first embodiment scans the plural laser beams in the same direction as their alignment directions to measure the distance in each beam direction. This permits the apparatus to be applied to a device which detects a time-change in the distance to the object in a scanning plane to generate warning as compared with the apparatus which measures the distances of field of view divided into many parts in scanning directions by scanning using one beam.

A distance measuring apparatus of the second embodiment of the present invention, in the distance measuring apparatus which projects plural laser beams in different directions and receives the light reflected from each of the objects in the respective beam directions to compute the respective distances, scans the plural laser beams in the directions orthogonal to their alignment directions to measure the distance in each beam direction. In accordance with the distance measuring apparatus of the second embodiment, the scanning in one direction permits the distance measurement to be also made in the direction orthogonal to the scanning direction. The time required for the two-dimensional distance measurement can be reduced to the fraction of the number of beams as compared with the measurement of distance in a raster scan. Further, the scanning apparatus has only to carry out the scanning in one direction. Thus, a high-speed two-dimensional distance measuring device can be produced at low cost.

A distance measuring apparatus of the third embodiment, according to the apparatus of the first embodiment, projects the plural laser beams in different separated directions so that the scanning of the respective laser beams is performed in such a manner that the intervals between them are interpolated. Therefore, the plural laser beams are not required to be adjacent to each other and can be converged by a lens having a short focal distance. Thus, the entire apparatus can be miniaturized.

A distance measuring apparatus of the fourth embodiment of the present invention, in the apparatus according to the first embodiment, projects the plural laser beams in different separated directions and scans the respective laser beams in such a manner that the intervals between them are interpolated and thereafter shifts the scanning to the outermost adjacent position of the next scanning state. The plural beams are not required to be adjacent to each other and the interval between the plural beams can be set optionally so that the freedom in designing an optical system can be increased and the plural beams can be converged by a lens having a short focal distance. The entire apparatus can be miniaturized.

A distance measuring apparatus of the fifth embodiment of the present invention, in the apparatus according to the first embodiment, divides every interval between two adjacent laser beams of N laser beams into a number of the intervals less than square of N, other than integer-times of any prime numbers less than N and other than 1, and performs the scanning in such a manner that the shift of said divided N intervals is made as one scanning. Therefore, in the process, the intervals between the laser beams can be efficiently and uniformly filled with no overlap of the plural beam directions.

What is claimed is:

1. A distance measuring apparatus comprising:
   projection means for projecting plural laser beams in different directions;
   light receiving means for receiving the light reflected from each of objects in respective beam directions;
   computation means for computing the distances to the objects on the basis of the reflected light; and
   scanning means for sequentially changing the projecting directions of said plural laser beams such that a scan having a resolution of field of view of 0.5 degrees or less is performed.

2. A distance measuring apparatus according to claim 1, wherein the plural laser beams are scanned in the same direction as their alignment directions.

3. A distance measuring apparatus according to claim 1, wherein the plural laser beams are scanned in the directions orthogonal to their alignment directions.

4. A distance measuring apparatus according to claim 2, wherein the plural laser beams are projected in different separated directions and the scanning of the respective beams is performed in such a manner that the intervals between them are interpolated.

5. A distance measuring apparatus according to claim 2, wherein the plural laser beams are projected in different separated directions, the scanning of the respective beams is performed in such a manner that the intervals between them are interpolated, and thereafter the scanning is shifted to the outermost adjacent position of the next scanning state.

6. A distance measuring apparatus according to claim 2, wherein every interval between two adjacent laser beams of N laser beams is divided into a number of intervals which is less than the square of N, other than integer-times of any prime numbers less than N and other than 1, and wherein the scanning is performed in such a manner that the shift of said divided N intervals is made as one scanning, where N is a number of laser beams.

* * * * *